J. J. CAHOON.
Cotton-Compresser.

No. 164,903. Patented June 29, 1875.

WITNESSES
Walter Miller
W. B. Ewart

INVENTOR
J. Joseph Cahoon
By Leggett & Leggett
Attorneys

THE GRAPHIC CO. PHOTO.-LITH. 39 & 41 PARK PLACE, N.Y.

UNITED STATES PATENT OFFICE.

J. JOSEPH CAHOON, OF MEMPHIS, TENNESSEE, ASSIGNOR OF ONE-FOURTH HIS RIGHT TO THOMAS H. CAHOON, OF CLEVELAND, OHIO.

IMPROVEMENT IN COTTON-COMPRESSES.

Specification forming part of Letters Patent No. 164,903, dated June 29, 1875; application filed May 24, 1875.

*To all whom it may concern:*

Be it known that I, J. JOSEPH CAHOON, of Memphis, in the county of Shelby and State of Tennessee, have invented certain new and useful Improvements in Cotton-Compress; and I do hereby declare the following to be a full, clear, and exact description of the invention, such as will enable others skilled in the art to which it pertains to make and use it, reference being had to the accompanying drawings, which form part of this specification.

My invention relates to machinery for compressing cotton-bales, commonly known as a cotton-compress.

The object of the invention is to take cotton-bales as they are ordinarily found in the market, and for the purpose of economizing space to compress the said bales into a much smaller compass.

My invention consists in a peculiar construction of the platens between which the bale is compressed, the said platens being formed with jaws that stand open to receive the bale; but as the platens are pressed together upon the bale, the resistance of the bale causes the jaws to close, and thereby to compress the bale simultaneously in the direction of its breadth and thickness, as hereinafter more fully set forth and claimed.

Figure 1:
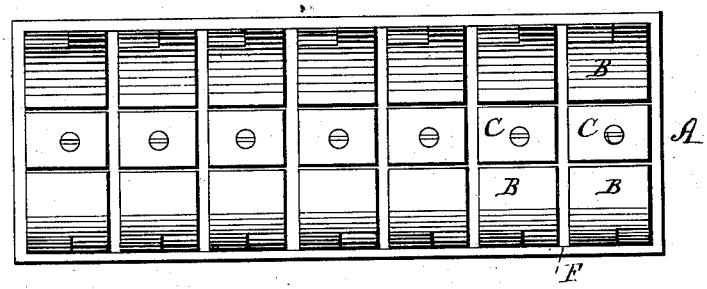
Figure 2:
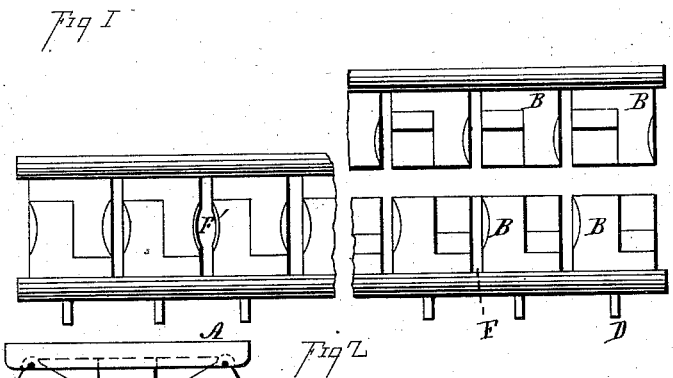
Figure 3:
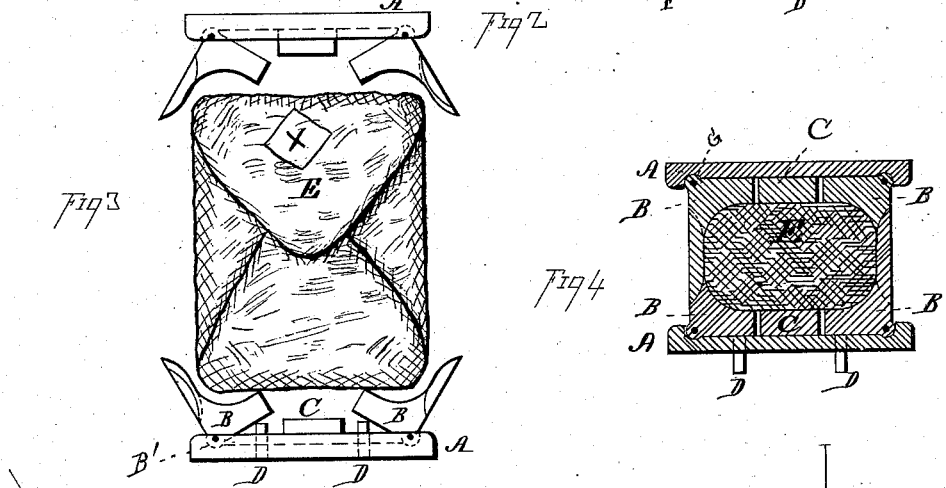
Figure 4:
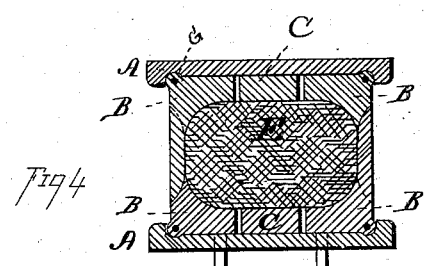

In the drawings, Figure 1 is a plan view of one of the platens. Fig. 2 is a side elevation of same, one portion representing the two platens pressed together, the other portion representing them separated. Fig. 3 represents the upper platen and lower platen standing open, with a bale of cotton resting upon the lower one. Fig. 4 is a cross-section, representing the bale compressed between the two platens, caused by raising the lower platen up against the upper one.

A is the bed-plate of either platen. B are jaws, hinged at B' to the bed-plate. C is a central abutment. D are suitable loose pins or projections, whereby, when the lower platen is dropped down upon the flat surface, the loose pins are driven in and cause the lower jaws to open outward. The jaws of the upper platen are constructed in similar form; but as they open by their own gravity, there is no necessity for the loose pins D. E is a cotton-bale. It is placed upon the open jaws of the lower platen, as indicated in Fig. 3. The lower platen is then raised up by suitable machinery until the bale is pressed firmly between the two platens. The pressure is then applied with great force until the resistance of the bale, due to the pressure, causes the jaws to rest firmly against the bed-plate and mesh together, presenting the appearance shown in Fig. 4. In this way, it will be observed, the bale is simultaneously compressed both laterally and vertically. F are spaces left between the jaws B for the purpose of fastening the bands or hoops about the bale. If the bale-tie is of a greater breadth than the band the openings F' are hollowed out from the sides of the jaws, so as to permit the bale-tie to spring through against the bale. After the bale has been suitably compressed and bound, the pressure is relieved, which completes the operation, and the bale is removed.

It will be seen that the jaws B of the upper platen are so countershaped with respect to the jaws of the lower platen that when the two come together they will mesh into each other, as shown at the left in Fig. 2. The jaws B are hinged to the bed-plate A very securely, in order to prevent the bale, by its expansion, from causing the jaws to separate or break from their bearings. In the drawings, the jaws are represented as trunnioned into the bed-plate, the separate jaws being united by a rod, G.

My invention does not contemplate the employment of any particular kind of press, nor of any particular kind of power for operating the same, but it is designed for and adapted to any kind of press wherein the jaws are forced toward each other. I employ, however, generally a press wherein the lower platen is forced up against the stationary upper platen by steam or hydraulic power.

I am not aware that a bale-compress has ever before been made, whereby the bale is pressed simultaneously both laterally and vertically.

It will be seen, by an examination of Fig. 4, that the space occupied by the bale when the platens are pressed together is elongated in form and has round corners. This form facilitates the fastening of the bands. They can be fastened close to the bale; it would not be practicable were the bale left with square or nearly square corners. The result is that the bale can be so closely tied with the bands that there is very little expansion when the pressure is removed.

What I claim as new, and desire to secure by Letters Patent, is—

1. The bale-compress consisting of the platens A and the jaws B hinged thereto, whereby a bale interposed between the two platens is, by forcing the platens together, simultaneously pressed both laterally and vertically, substantially as and for the purpose described.

2. The combination, with the platens A, of jaws B hinged thereto, the said jaws upon the upper platen formed, as respects the jaws upon the lower platen, so that they will mesh together as the platens approach each other, substantially as and for the purpose described.

3. The combination, with the platen A and hinged jaws B, of loose pins D, whereby the jaws are automatically opened, substantially as and for the purpose described.

In testimony whereof I have signed my name to this specification in the presence of two subscribing witnesses.

J. JOSEPH CAHOON.

Witnesses:
 H. T. HOWER,
 FRANCIS TOUMEY.